United States Patent
Lopatecki et al.

(10) Patent No.: US 10,270,870 B2
(45) Date of Patent: *Apr. 23, 2019

(54) PASSIVELY MONITORING ONLINE VIDEO VIEWING AND VIEWER BEHAVIOR

(71) Applicant: Adobe Inc., San Jose, CA (US)

(72) Inventors: Jason Lopatecki, San Francisco, CA (US); Adam Rose, San Pablo, CA (US); John Hughes, Lafayette, CA (US); Brett Wilson, Alameda, CA (US)

(73) Assignee: ADOBE INC., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/680,605

(22) Filed: Aug. 18, 2017

(65) Prior Publication Data

US 2017/0346913 A1 Nov. 30, 2017

Related U.S. Application Data

(63) Continuation of application No. 15/285,356, filed on Oct. 4, 2016, now Pat. No. 9,781,221, which is a
(Continued)

(51) Int. Cl.
*H04H 60/33* (2008.01)
*H04H 60/45* (2008.01)
(Continued)

(52) U.S. Cl.
CPC .............. *H04L 67/22* (2013.01); *G06F 15/16* (2013.01); *H04N 21/252* (2013.01);
(Continued)

(58) Field of Classification Search
CPC ....... H04N 21/44213; H04N 21/44222; H04N 21/4532; H04N 21/466; H04N 21/4667
See application file for complete search history.

(56) References Cited

U.S. PATENT DOCUMENTS 5,617,486 A 4/1997 Chow et al.
5,778,340 A 7/1998 Hattori
(Continued)

FOREIGN PATENT DOCUMENTS

WO    WO 2006-076661    7/2006

OTHER PUBLICATIONS

U.S. Appl. No. 15/348,780, Oct. 5, 2017, Office Action.
(Continued)

*Primary Examiner* — Kyu Chae
(74) *Attorney, Agent, or Firm* — Keller Jolley Preece

(57) ABSTRACT

Various user behaviors are passively monitored and recorded when a user/viewer interacts with a network video player, e.g. a web video player, while watching an online video clip. For one embodiment, a data collection agent (DCA) is loaded to the player and/or to a web page that displays the video clip. The DCA passively collects detailed viewing and behavior information without requiring any specific input or actions on the part of the user. Indications of user preferences are inferred by user actions leading up to viewing the video, while viewing the video, and just after and still related to viewing the video. The DCA periodically sends this information to a central server where it is stored in a central database and where it is used to determine preference similarities among different users. Recorded user preference information may also be used to rate a video itself.

20 Claims, 7 Drawing Sheets

Related U.S. Application Data continuation of application No. 13/975,196, filed on Aug. 23, 2013, now Pat. No. 9,485,316, which is a continuation of application No. 12/904,552, filed on Oct. 14, 2010, now Pat. No. 8,549,550, which is a continuation-in-part of application No. 12/212,556, filed on Sep. 17, 2008, now Pat. No. 8,577,996.

(60) Provisional application No. 60/960,144, filed on Sep. 18, 2007.

(51) Int. Cl.
  *H04H 60/56* (2008.01)
  *H04H 60/32* (2008.01)
  *H04L 29/08* (2006.01)
  *G06F 15/16* (2006.01)
  *H04N 21/25* (2011.01)
  *H04N 21/442* (2011.01)
  *H04N 21/658* (2011.01)
  *H04N 21/258* (2011.01)

(52) U.S. Cl.
  CPC . *H04N 21/25891* (2013.01); *H04N 21/44222* (2013.01); *H04N 21/6582* (2013.01)

(56) References Cited

U.S. PATENT DOCUMENTS

| | | | |
|---|---|---|---|
| 5,864,810 A | 1/1999 | Digalakis et al. | |
| 5,951,642 A * | 9/1999 | Onoe | G06Q 30/02 709/224 |
| 6,134,532 A | 10/2000 | Lazarus et al. | |
| 6,208,720 B1 | 3/2001 | Curtis | |
| 6,223,159 B1 | 4/2001 | Ishii | |
| 6,285,999 B1 | 9/2001 | Page | |
| 6,343,267 B1 | 1/2002 | Kuhn et al. | |
| 6,389,377 B1 | 5/2002 | Pineda et al. | |
| 6,505,169 B1 | 1/2003 | Bhagavath et al. | |
| 6,557,042 B1 * | 4/2003 | He | G06F 17/30017 707/999.001 |
| 6,560,578 B2 | 5/2003 | Eldering et al. | |
| 6,704,930 B1 | 3/2004 | Eldering et al. | |
| 6,879,956 B1 | 4/2005 | Honda et al. | |
| 6,888,477 B2 | 5/2005 | Lai et al. | |
| 6,907,566 B1 | 6/2005 | McElfresh et al. | |
| 6,944,585 B1 | 9/2005 | Pawson | |
| 6,952,419 B1 | 10/2005 | Cassiday et al. | |
| 7,065,488 B2 | 6/2006 | Yajima et al. | |
| 7,117,439 B2 | 10/2006 | Barrett et al. | |
| 7,136,875 B2 | 11/2006 | Anderson et al. | |
| 7,146,416 B1 | 12/2006 | Yoo et al. | |
| 7,149,772 B1 | 12/2006 | Kalavade | |
| 7,356,590 B2 | 4/2008 | Wilson et al. | |
| 7,822,636 B1 | 10/2010 | Ferber et al. | |
| 8,060,463 B1 | 11/2011 | Spiegel | |
| 8,301,497 B2 | 10/2012 | Amini et al. | |
| 8,549,550 B2 * | 10/2013 | Lopatecki | G06F 15/16 725/10 |
| 8,577,996 B2 | 11/2013 | Hughes et al. | |
| 9,485,316 B2 * | 11/2016 | Lopatecki | G06F 15/16 |
| 9,612,995 B2 | 4/2017 | Lopatecki et al. | |
| 9,781,221 B2 * | 10/2017 | Lopatecki | H04L 67/22 |
| 2002/0032904 A1 | 3/2002 | Lerner | |
| 2002/0049635 A1 | 4/2002 | Mai et al. | |
| 2002/0059604 A1 | 5/2002 | Papagan et al. | |
| 2002/0068525 A1 | 6/2002 | Brown et al. | |
| 2002/0082941 A1 | 6/2002 | Bird | |
| 2002/0087980 A1 | 7/2002 | Eldering et al. | |
| 2002/0144261 A1 | 10/2002 | Schwalb et al. | |
| 2002/0174425 A1 | 11/2002 | Markel et al. | |
| 2003/0050863 A1 | 3/2003 | Radwin | |
| 2003/0055729 A1 | 3/2003 | Bezos et al. | |
| 2003/0055951 A1 | 3/2003 | Chemali | |
| 2003/0061566 A1 | 3/2003 | Rubstein et al. | |
| 2003/0070167 A1 | 4/2003 | Holtz et al. | |
| 2003/0076347 A1 | 4/2003 | Barrett et al. | |
| 2003/0079226 A1 | 4/2003 | Barrett | |
| 2003/0101230 A1 | 5/2003 | Benschoter et al. | |
| 2003/0110485 A1 | 6/2003 | Lu et al. | |
| 2003/0121046 A1 | 6/2003 | Roy et al. | |
| 2003/0142670 A1 | 7/2003 | Gould et al. | |
| 2003/0174837 A1 | 9/2003 | Candelore et al. | |
| 2003/0206720 A1 | 11/2003 | Abecassis | |
| 2003/0220791 A1 | 11/2003 | Toyama | |
| 2004/0001081 A1 | 1/2004 | Marsh | |
| 2004/0003397 A1 | 1/2004 | Boston et al. | |
| 2004/0051812 A1 | 3/2004 | Hayward | |
| 2004/0059708 A1 | 3/2004 | Dean | |
| 2004/0059712 A1 | 3/2004 | Dean et al. | |
| 2004/0073918 A1 | 4/2004 | Ferman et al. | |
| 2004/0093327 A1 | 5/2004 | Anderson et al. | |
| 2004/0172267 A1 | 9/2004 | Patel et al. | |
| 2004/0204983 A1 | 10/2004 | Shen et al. | |
| 2004/0221309 A1 | 11/2004 | Zaner et al. | |
| 2004/0267806 A1 | 12/2004 | Lester | |
| 2005/0021403 A1 | 1/2005 | Ozer et al. | |
| 2005/0076357 A1 | 4/2005 | Fenne | |
| 2005/0102375 A1 | 5/2005 | Varghese | |
| 2005/0114198 A1 | 5/2005 | Koningstein et al. | |
| 2005/0114367 A1 * | 5/2005 | Serebrennikov | G06F 17/30887 |
| 2005/0137958 A1 | 6/2005 | Huber et al. | |
| 2005/0149396 A1 | 7/2005 | Horowitz et al. | |
| 2005/0182626 A1 | 8/2005 | Kim et al. | |
| 2005/0190973 A1 | 9/2005 | Kristensson et al. | |
| 2005/0192802 A1 | 9/2005 | Robinson et al. | |
| 2005/0210145 A1 | 9/2005 | Kim et al. | |
| 2005/0246348 A1 | 11/2005 | Hijikata et al. | |
| 2006/0026067 A1 | 2/2006 | Nicholas et al. | |
| 2006/0026628 A1 | 2/2006 | Wan et al. | |
| 2006/0031187 A1 * | 2/2006 | Pyrce | G06F 3/04815 |
| 2006/0058999 A1 | 3/2006 | Barker et al. | |
| 2006/0063587 A1 | 3/2006 | Manzo | |
| 2006/0064500 A1 | 3/2006 | Roth et al. | |
| 2006/0074753 A1 | 4/2006 | Schuh et al. | |
| 2006/0116924 A1 | 6/2006 | Angles et al. | |
| 2006/0135232 A1 | 6/2006 | Willis | |
| 2006/0156326 A1 | 7/2006 | Goronzy et al. | |
| 2006/0161553 A1 | 7/2006 | Woo | |
| 2006/0167749 A1 | 7/2006 | Pitkow et al. | |
| 2006/0212350 A1 | 9/2006 | Ellis et al. | |
| 2006/0212897 A1 | 9/2006 | Li et al. | |
| 2006/0224444 A1 | 10/2006 | Koningstein et al. | |
| 2006/0224448 A1 | 10/2006 | Herf | |
| 2006/0242016 A1 | 10/2006 | Chenard | |
| 2007/0055986 A1 | 3/2007 | Gilley et al. | |
| 2007/0067215 A1 | 3/2007 | Agarwal et al. | |
| 2007/0078707 A1 | 4/2007 | Axe et al. | |
| 2007/0078948 A1 | 4/2007 | Julia et al. | |
| 2007/0094363 A1 | 4/2007 | Yruski et al. | |
| 2007/0101387 A1 | 5/2007 | Hua et al. | |
| 2007/0112567 A1 | 5/2007 | Lau et al. | |
| 2007/0112630 A1 | 5/2007 | Lau et al. | |
| 2007/0118848 A1 | 5/2007 | Schwesinger et al. | |
| 2007/0184820 A1 | 8/2007 | Marshall | |
| 2007/0219984 A1 | 9/2007 | Aravamudan et al. | |
| 2007/0226365 A1 | 9/2007 | Hildreth et al. | |
| 2007/0268164 A1 | 11/2007 | Lai et al. | |
| 2007/0300258 A1 | 12/2007 | O'Connor et al. | |
| 2008/0010339 A1 | 1/2008 | Shin et al. | |
| 2008/0010654 A1 | 1/2008 | Barrett et al. | |
| 2008/0045336 A1 | 2/2008 | Stelzer et al. | |
| 2008/0046562 A1 | 2/2008 | Butler | |
| 2008/0059312 A1 | 3/2008 | Gern et al. | |
| 2008/0066107 A1 | 3/2008 | Moonka | |
| 2008/0092159 A1 | 4/2008 | Dmitriev et al. | |
| 2008/0098301 A1 | 4/2008 | Black et al. | |
| 2008/0101763 A1 * | 5/2008 | Bhogal | H04N 5/782 386/291 |
| 2008/0109300 A1 | 5/2008 | Bason | |
| 2008/0109391 A1 | 5/2008 | Chan | |
| 2008/0133475 A1 | 6/2008 | Fischer | |
| 2008/0178198 A1 | 7/2008 | Gauba | |

(56) References Cited

U.S. PATENT DOCUMENTS

| | | |
|---|---|---|
| 2008/0178234 A1 | 7/2008 | Eyal |
| 2008/0183555 A1 | 7/2008 | Walk |
| 2008/0195761 A1 | 8/2008 | Jabri et al. |
| 2008/0207182 A1 | 8/2008 | Maharajh et al. |
| 2008/0228576 A1 | 9/2008 | Yonezaki |
| 2008/0228581 A1 | 9/2008 | Yonezaki et al. |
| 2008/0250445 A1 | 10/2008 | Zigmond et al. |
| 2008/0288973 A1 | 11/2008 | Carson et al. |
| 2008/0300989 A1 | 12/2008 | Coker et al. |
| 2008/0307454 A1* | 12/2008 | Ahanger ............... G06Q 30/02 725/36 |
| 2008/0319827 A1 | 12/2008 | Yee et al. |
| 2008/0320531 A1 | 12/2008 | Kim et al. |
| 2009/0007172 A1 | 1/2009 | Ahanger et al. |
| 2009/0013347 A1 | 1/2009 | Ahanger et al. |
| 2009/0019488 A1 | 1/2009 | Ruiz-Velasco et al. |
| 2009/0077033 A1 | 3/2009 | McGary et al. |
| 2009/0089830 A1 | 4/2009 | Chandratillake et al. |
| 2009/0094520 A1 | 4/2009 | Kulas |
| 2009/0100456 A1 | 4/2009 | Hughes |
| 2009/0119169 A1 | 5/2009 | Chandratillake et al. |
| 2009/0144780 A1 | 6/2009 | Toebes et al. |
| 2009/0171728 A1 | 7/2009 | Yan et al. |
| 2009/0183210 A1 | 7/2009 | Andrade |
| 2009/0259551 A1 | 10/2009 | Chenard et al. |
| 2009/0259552 A1 | 10/2009 | Chenard et al. |
| 2009/0328105 A1 | 12/2009 | Craner |
| 2010/0011020 A1 | 1/2010 | Bouzid et al. |
| 2010/0023960 A1 | 1/2010 | Hasson |
| 2010/0049613 A1 | 2/2010 | Angles et al. |
| 2010/0057576 A1 | 3/2010 | Brodersen et al. |
| 2010/0088394 A1 | 4/2010 | Barbieri et al. |
| 2010/0088614 A1 | 4/2010 | Barbieri et al. |
| 2010/0095317 A1* | 4/2010 | Toebes ............... H04N 7/163 725/9 |
| 2010/0114696 A1 | 5/2010 | Yang |
| 2010/0191680 A1 | 7/2010 | Lee et al. |
| 2010/0242060 A1* | 9/2010 | Liu ............... G06Q 30/02 725/9 |
| 2010/0251305 A1* | 9/2010 | Kimble ............... H04N 7/17318 725/46 |
| 2010/0287580 A1 | 11/2010 | Harding et al. |
| 2010/0318611 A1* | 12/2010 | Curtin ............... G06F 15/16 709/206 |
| 2011/0010231 A1 | 1/2011 | Price et al. |
| 2011/0029666 A1 | 2/2011 | Lopatecki et al. |
| 2011/0072449 A1 | 3/2011 | Ivanyi |
| 2011/0078018 A1 | 3/2011 | Chunilal |
| 2011/0078740 A1 | 3/2011 | Bolyukh et al. |
| 2011/0093783 A1 | 4/2011 | Parra |
| 2011/0125573 A1 | 5/2011 | Yonezaki et al. |
| 2011/0295716 A1 | 12/2011 | Dumon et al. |
| 2012/0278169 A1 | 11/2012 | Lau et al. |
| 2013/0145388 A1 | 6/2013 | Girouard et al. |
| 2013/0185153 A1 | 7/2013 | Howcroft |
| 2014/0298373 A1 | 10/2014 | Jing et al. |
| 2017/0026479 A1 | 1/2017 | Lopatecki et al. |
| 2017/0094331 A1 | 3/2017 | Lopatecki et al. |
| 2018/0227615 A1 | 8/2018 | Lopatecki et al. |

OTHER PUBLICATIONS

Chorianopoulos, K et al., "Affective Usability Evaluation for an Interactive Music Television Channel", ACM Computer in Entertainment. vol. 2, No. 3. Article 78. Retrieved Apr. 24, 2008 from the internet: http://www.dmst.aueb.gr/dds/pubs/jrnl/2004-CIE-VC/html/CS04b.pdf, Jul. 2004, 1-11.

Hanjalic, A et al., "Affective Video Content Representation and Modeling", IEEE Transactions on Multimedia. vol. 7, No. 1., Feb. 2005, pp. 143-154.

Mihalcea, R et al., "A Corpus-Based Approach to Finding Happiness", AAAI Spring Symposium, Mar. 2006, pp. 1-6.

Mihalcea, R et al., "Learning to Laugh (Automatically): Computational Models for Humor Recognition", Computational Intelligence. vol. 22, Issue 2., May 2006, pp. 126-142.

Young, S et al., "The HTK Book", Microsoft. Hidden Markov Model Toolkit User Manual., Jul. 2000, 277 pages.

Flanagan, David, "JavaScript: The Definitive Guide, 5th Edition", O'Reilly Media, (Aug. 17, 2006), pp. 271-272 and 536-538.

U.S. Appl. No. 11/871,880, Dec. 9, 2009, Office Action.
U.S. Appl. No. 11/871,880, Jun. 8, 2010, Office Action.
U.S. Appl. No. 11/871,880, Dec. 20, 2010, Office Action.
U.S. Appl. No.11/871,880, Aug. 10, 2011, Office Action.
U.S. Appl. No. 12/212,556, Nov. 17, 2009, Office Action.
U.S. Appl. No. 12/212,556, May 13, 2010, Office Action.
U.S. Appl. No. 12/212,556, Sep. 21, 2010, Office Action.
U.S. Appl. No. 12/212,556, Mar. 10, 2011, Office Action.
U.S. Appl. No. 12/212,556, May 10, 2012, Office Action.
U.S. Appl. No. 12/212,556, Feb. 4, 2013, Office Action.
U.S. Appl. No. 12/212,556, Aug. 22, 2013, Notice of Allowance.
U.S. Appl. No. 12/904,552, Apr. 26, 2012, Office Action.
U.S. Appl. No. 12/904,552, Dec. 18, 2012, Office Action.
U.S. Appl. No. 12/904,552, May 30, 2013, Notice of Allowance.
U.S. Appl. No. 13/111,705, Jul. 31, 2014, Office Action.
U.S. Appl. No. 13/111,705, Mar. 10, 2015, Office Action.
U.S. Appl. No. 13/111,705, Feb. 23, 2016, Office Action.
U.S. Appl. No. 13/111,705, Aug. 10, 2016, Office Action.
U.S. Appl. No. 13/111,705, Nov. 16, 2016, Notice of Allowance.
U.S. Appl. No. 13/975,196, Jul. 21, 2015, Office Action.
U.S. Appl. No. 13/975,196, May 13, 2016, Office Action.
U.S. Appl. No. 13/975,196, Sep. 26, 2016, Notice of Allowance.
U.S. Appl. No. 15/285,356, Feb. 10, 2017, Office Action.
U.S. Appl. No. 15/285,356, May 18, 2017, Notice of Allowance.
U.S. Appl. No. 15/348,780, Feb. 5, 2018, Notice of Allowance.
U.S. Appl. No. 15/940,882, dated Feb. 7, 2019, Office Action.

* cited by examiner

PASSIVELY MONITORING ONLINE VIDEO VIEWING AND VIEWER BEHAVIOR

CROSS REFERENCE TO RELATED APPLICATIONS

This application is a continuation of U.S. application Ser. No. 15/285,356, filed Oct. 4, 2016, which is a continuation of U.S. application Ser. No. 13/975,196, filed Aug. 23, 2013, now issued as U.S. Pat. No. 9,485,316, which is a continuation of U.S. application Ser. No. 12/904,552, filed Oct. 14, 2010, now issued as U.S. Pat. No. 8,549,550, which is a continuation-in-part of U.S. application Ser. No. 12/212,556, filed Sep. 17, 2008, now issued as U.S. Pat. No. 8,577,996, which claims the benefit of and priority to U.S. Provisional Application No. 60/960,144, filed Sep. 18, 2007. Each of the aforementioned patent(s), and applications(s) is hereby incorporated by reference in its entirety.

BACKGROUND

Technical Field

The invention relates to the monitoring of a website and the interaction of a client with a website and with other persons via website- or email-based communication. More particularly, the invention relates to a method and apparatus for passively monitoring online video viewing and viewer behavior.

Description of the Background Art

Video clips may be supplied to viewers from any website for information, entertainment, or advertising purposes. Some of these websites may be Web 2.0 websites where a user can create an account, upload, share, contribute, comment, vote, or read personal opinions of other users, all on the same site. When video clips are viewed purely for entertainment purposes, users may be more motivated to rate a particular video clip according to their preferences. However, not all viewers expend the effort to rate a video, even if they feel strongly about it.

Video sharing and online video services allow individuals or content publishers to upload video clips to Internet websites. The website stores the video clip on its server, and provides different types of functions to allow others to view that video clip. These websites may allow commenting and rating of a video clip. Many services have options for private sharing and other publication options. Video sharing services can be classified into several categories including, user generated video sharing websites, video sharing platform, white label providers, and web based video editing.

As video hosting websites become increasingly popular, such websites provide a platform for traditional publishers, such as television broadcasters, to use these websites as another medium to display media content which may be of a more informative nature. For example, CBS and CNN networks often publish video clips on YouTube. For such publishers it is highly desirable to know the ratings of their published video clips. In television the ratings, e.g. Nielsen Ratings, estimate the audience size and composition of television programming, and thus determine advertising rates. This method is not applicable for the Internet. Again, given the opportunity to rate a particular video clip, not all viewers expend the effort to rate the video clip, even if they feel strongly about it.

Either independent of, or associated with, entertainment or informative video clips, advertisement video clips may also be supplied to online users. Supplying websites may or may not provide users a means to rate such advertisement clips. In circumstances where the advertisement is embedded as part of an entertainment or informative clip, such as a pre-roll advertisement, offering users a voluntary rating facility for the advertisement portion becomes difficult from a practicality standpoint.

In the related art there are different techniques to determine the popularity of a website. One technique known in the art refers to "page-hit" (or "page views"). The "page-hit" refers to an event in which a server receives a request for a page and then serves up the page. A common measure of traffic at a website is the number of page hits, especially in an advertising context, for particular pages or sets of pages. Page hit counts are a rough measure of the traffic of a website. Other techniques involve the analyzing of the traffic between a Web server and clients. Such prior art techniques work well when the traffic of interest relates to particular pages, but are generally not informative when traffic by topic is desired because one page may relate to multiple topics. Systems have been suggested for embedding script code in web pages for tracking user activity on a web page.

Another technique for determining the rating of video clips published on online video sites is based on viewership information provided by these sites. Typically, the sites count the cumulative number of users who view the clip. However, more refined measurements that include, for example, the quantity and characteristics of viewers, as well as detailed information about the duration and repetition of each view, are neither generated by video sharing websites nor by any other prior art technique. Furthermore, viewership information is easily manipulated by the use of, for example, scripts, browser refreshes, and other means that skew the results. As a result, ratings measurements that are based on the viewership information are inaccurate at best and often misleading.

Systems have been suggested for placement of advertising slots in hosted video clips. In such systems, methods are used to track the ad placement and viewing. Such methods require preparation of the video clips for ad placement.

It would be therefore advantageous to provide a solution for online video analytics for generally available video clips on the Internet.

BRIEF SUMMARY

Overall, to acquire user preference information for an advertisement video clip effectively, and to expand the base of user preference information for any video clip beyond those viewers who voluntarily rate a video clip, an embodiment of the invention provides a solution for passively recording various viewer behaviors from which user preferences may be inferred, and the users themselves may be rated according to their preferences. The gathered information can also be used to rate the video itself.

Thus, the method and apparatus described herein passively monitors and records various user behaviors when a user/viewer interacts with a network video player, e.g. a web video player, while watching an online video clip. For one embodiment, a data collection agent (DCA) is loaded to the player and/or to a web page that displays the video clip. The DCA passively collects detailed viewing and behavior information without requiring any specific input or actions on the part of the user. Indications of user preferences are inferred by user actions leading up to viewing the video, while viewing the video, and just after and still related to viewing the video. The DCA periodically sends this information to a central server where it is stored in a central database and where it is used to determine preference similarities among different users. Recorded user preference information may also be used to rate a video itself.

DETAILED DESCRIPTION

An embodiment of the invention passively monitors and records various user behaviors when a user/viewer interacts with a network video player, e.g. a web video player, while watching an online video clip. In one embodiment, a data collection agent (DCA) is loaded to the player and/or to a web page that displays the video clip. The DCA passively collects detailed viewing and behavior information without requiring any specific input or actions on the part of the user. Indications of user preferences are inferred by user actions leading up to viewing the video, while viewing the video, and just after and still related to viewing the video. The DCA periodically sends this information to a central server where it is stored in a central database and where it is used to determine preference similarities among different users. Recorded user preference information may also be used to rate a video itself.

In one embodiment, the invention comprises a method and/or an apparatus for monitoring and recording when a user interacts with a video player while watching a video clip online. Specifically, a data collection agent (DCA) is loaded to the player or to a web page that displays the video clip. The DCA collects detailed viewing information and periodically sends this information to a central server. The viewing information is processed by the central server and the central server then generates any of a viewership attention span report, a viewership demographics report, a viewership geographic report, and a viewership sharing report. The attention span report and the sharing report provide inferred user preference information that is used to rate a video clip passively without requiring any specific input from the user/viewer. For purposes of the discussion herein, the terms watching, viewing, and playing are used as interchangeably. When a video clip is playing it is assumed that the viewer is viewing or watching the clip. However, the viewer may in fact be watching something else and not the video clip at a particular moment in time. There is no way to know for sure and, thus, the assumption is made.

Figure 1:
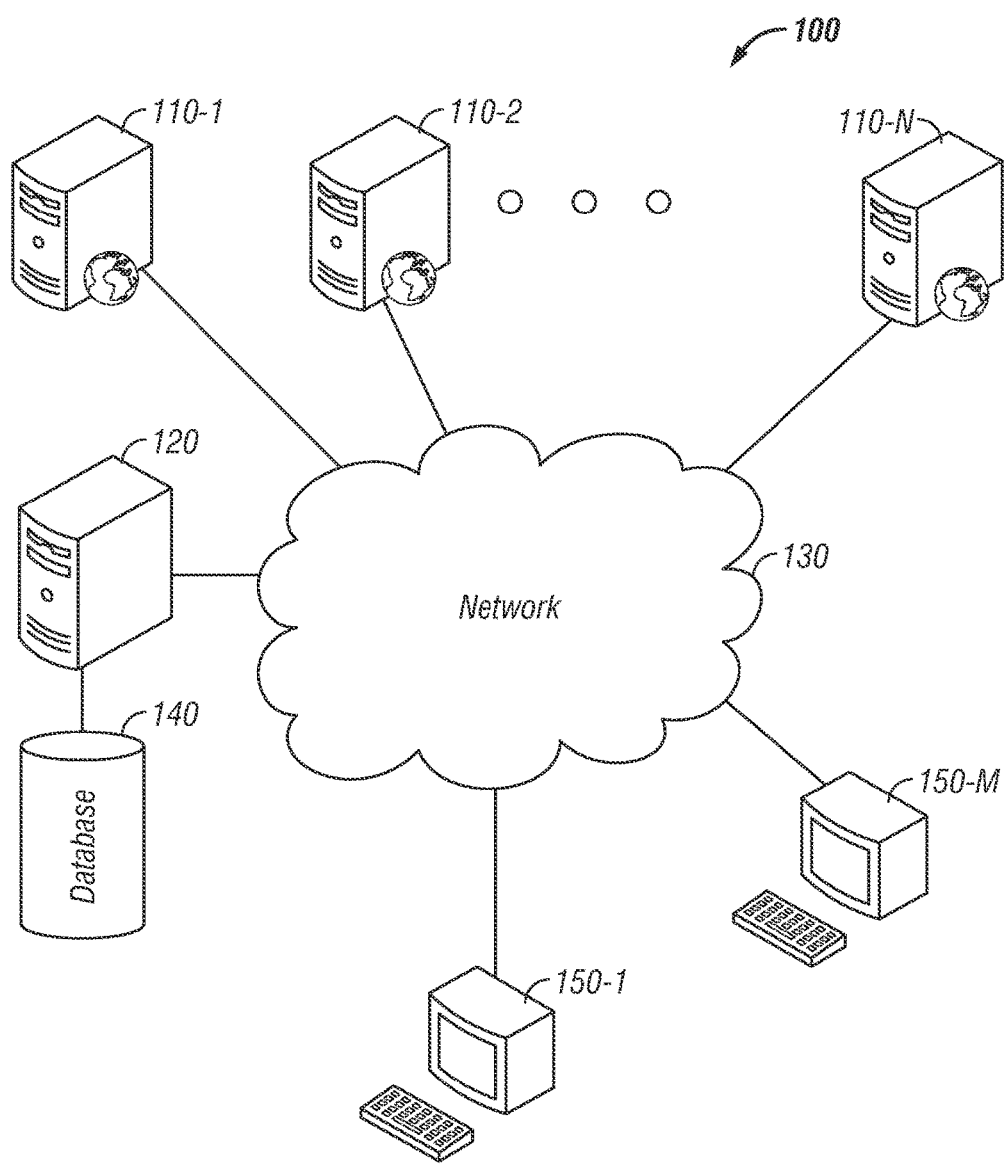
FIG. 1 is a block schematic diagram of a network for use in connection with the various embodiments of the invention disclosed herein.

FIG. 1 is a block schematic diagram of an arrangement of elements 100 that may be used in connection with the invention. These elements 100 include at least a web server 110 for hosting video sharing websites. The websites include, but are not limited to, YouTube™, MetaCafe™, Google® video, Yahoo® video, Myspace.com.®, users' blogs, etc.

A viewership analytics server (VAS) 120 is configured to connect to each web server 110 through a network 130, for example, but not limited to, a wide area network (WAN), which enables connectivity such as Internet connectivity. The VAS 120 executes the tasks related to gathering of viewership information for web servers 110, analyzing the gathered information, and generating reports on the quantity and characteristics of viewers, as well as providing information about the duration and repetition of each view. These tasks are described in greater detail below. The VAS 120 is connected to a database 140 in which the collected and generated viewership data is saved.

Clients 150-1 through 150-M communicate with web servers 110 through the network 130. A client 150 comprises at least a web browser, such as Microsoft® Internet Explorer, that allows the user to view and navigate through web pages downloaded from one or more servers 110. Each client 150 is capable of downloading, playing, and displaying video clips provided by the servers 110. With this aim, each client 150 is capable of running a video player (not shown), which is typically integrated into a web page. The video player may be, but is not limited to, a Flash-based web player, DivX web player, Microsoft Media Player, etc.

In accordance with the principles of the invention, a data collector agent (DCA) is loaded to video sharing websites that are hosted on servers 110 to capture information about the interactions of the viewers with web players. The DCA may be a script code, e.g. JavaScript, hosted by the VAS 120 and loaded to web pages hosted on servers 110. The DCA may be also in a form of a plug-in installed in the video players provided by video content providers.

The DCA collects and sends metadata and detailed viewing information to the VAS 120. The metadata comprises at least a video identification (ID), a publisher ID, a website ID that is derived from the uniform resource locator (URL), a length of the video clip being viewed, and the current time. The detailed viewing information includes the actions performed on the player and a timestamp. The recorded actions may be, for example, playing, pausing, rewinding, forwarding, and so on. The timestamp start and end times are expressed, for example, in seconds from the beginning of the video clip. For instance, the pair <play, 20-35> means that a user viewed the clip for only for 15 seconds starting at the 20.sup.th second from the beginning. The pair <pause, 30> means that the user paused 30 seconds after the beginning of the clip. The data gathered by the DCA is used by the VAS 120. In one embodiment, these requests are sent to the VAS 120 in the form of a hypertext transfer protocol (HTTP) request. An HTTP request that includes the metadata is sent to the VAS 120 once a web page, including the DCA, has completely uploaded to a client's 150 browser. The detailed viewing information, including the pairs of actions and timestamps, is periodically sent to the VAS 120. The VAS 120 extracts the data encapsulated in the received requests and saves the data in the database 140.

In accordance with one embodiment of the invention users, e.g. advertisers and content publishers, can access the VAS 120 through, for example, a client 150. This process is similar to that used when a user viewing the content accesses the VAS 120. Advertisers and content publishers can designate which websites, publishers, and video clips to trace. In one embodiment of the invention, the user views generated data from the VAS 120 by logging onto a web site.

Figure 2:
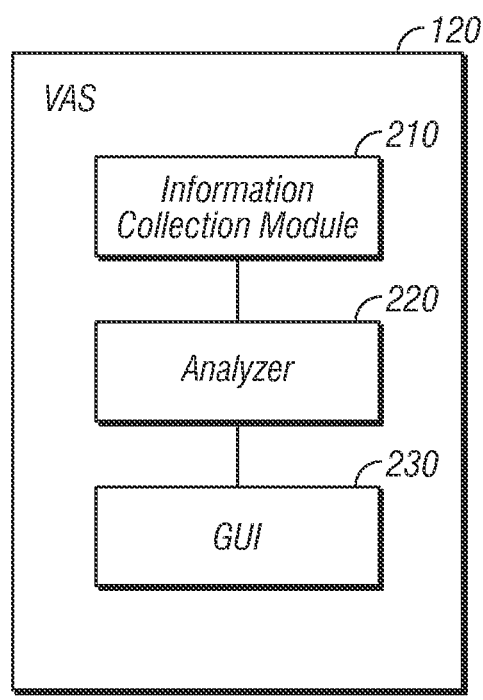
FIG. 2 is a block schematic diagram of a viewership analytics server (VAS) according to the invention.

FIG. 2 is a block diagram showing the VAS 120 implemented in accordance with one embodiment of the invention. The VAS 120 includes an information collection module 210, an analyzer 220, and a graphical user interface (GUI) module 230. The collection module 210 communicates with a DCA on a client 150 for the purpose of receiving HTTP requests and responding thereto. Specifically, the module 210 generates HTTP responses containing the script code of the DCA. The information collection module 210 further receives the HTTP requests, including the data collected by the DCA, extracts the information from the requests, and saves the information in the database 140. This information includes detailed viewing information and content metadata, which is saved together with tracking data including, but not limited to, the Internet protocol (IP) address, as well as the operating system and browser type of the client 150. The detailed viewing information is saved in an entry associated with the video ID. In an exemplary embodiment, the database 140 includes a table having the following fields: video ID, website ID, publisher ID, date, IP, OS, browser type, and <action, timestamp> pairs.

The analyzer 220 processes the information saved in the database 140 to generate viewership-related analytics data, an attention span report, and viewership demographics. Viewership-related analytics data includes, but is not limited to, the number of viewers during any period of time, e.g. last three days, last week, last months, etc. for a video clip, for a publisher, or for a group of video clips over different periods of time. This information can be generated for a single website or across a plurality of websites. To generate the analytics data mentioned herein, the analyzer 220 first computes the number of viewers in each day, or any other time interval, from the gathered information. The process for generating the viewership-related analytics data is further discussed in U.S. patent application Ser. No. 11/871,880, A Method and System for Monitoring Online Video, assigned to a common assignee, the entirety of which is incorporated herein by this reference thereto.

The analyzer 220 also generates an attention span report that includes detailed information about the duration and repetition of each view. This report includes, per each video clip, the total number of viewers, and the number of viewers that viewed the complete video clip. This report is produced by processing the data stored in the database 140. In addition, the analyzer 220 produces a viewership-geographic report. This report includes the number of viewers of a video clip in each country around the globe. The report is generated by correlating the number of views with IP addresses of the different viewers. Furthermore, a viewership demographics report is generated by analyzer 220. This report correlates the number of viewers with demographics including race, age, income, educational attainment, employment status, etc. The demographics are retrieved from the users' profiles as saved in the online video websites, if and when available.

In accordance with another embodiment, the analyzer 220 can detect fraud attempts. Such attempts are typically performed by browser refreshes or scripting intended to inflate the view count artificially. With this aim, the analyzer 220 maintains a history file of the video IDs that have been viewed in the past during a predefined period of time, e.g. video clips viewed in last two hours, by each IP address. If the analyzer 220 detects multiple views above a threshold from the same IP address within a predefined period time, the analyzer 220 discards the data regarding the subsequent views or any views. The analyzer 220 also validates that the database 140 does not contain timestamp entries with duration longer than the length of the video clip. This check protects against scripting attacks intended to record repeated video views under a single view count.

Figure 3A:
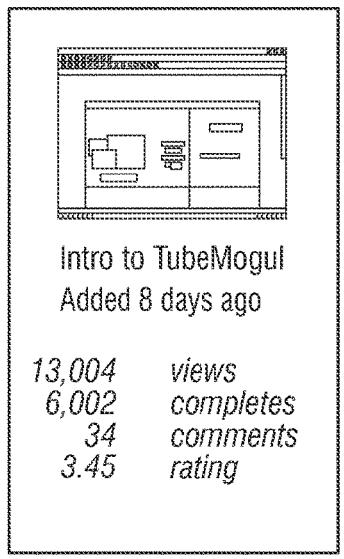
FIGS. 3A-3C are examples of charts generated by the VAS according to the invention.
Figure 3A:
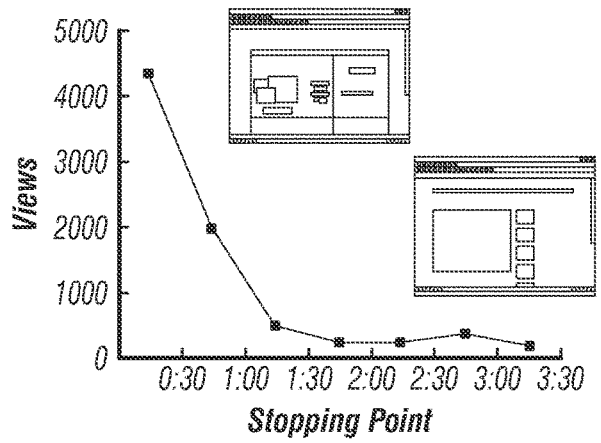
Figure 3B:
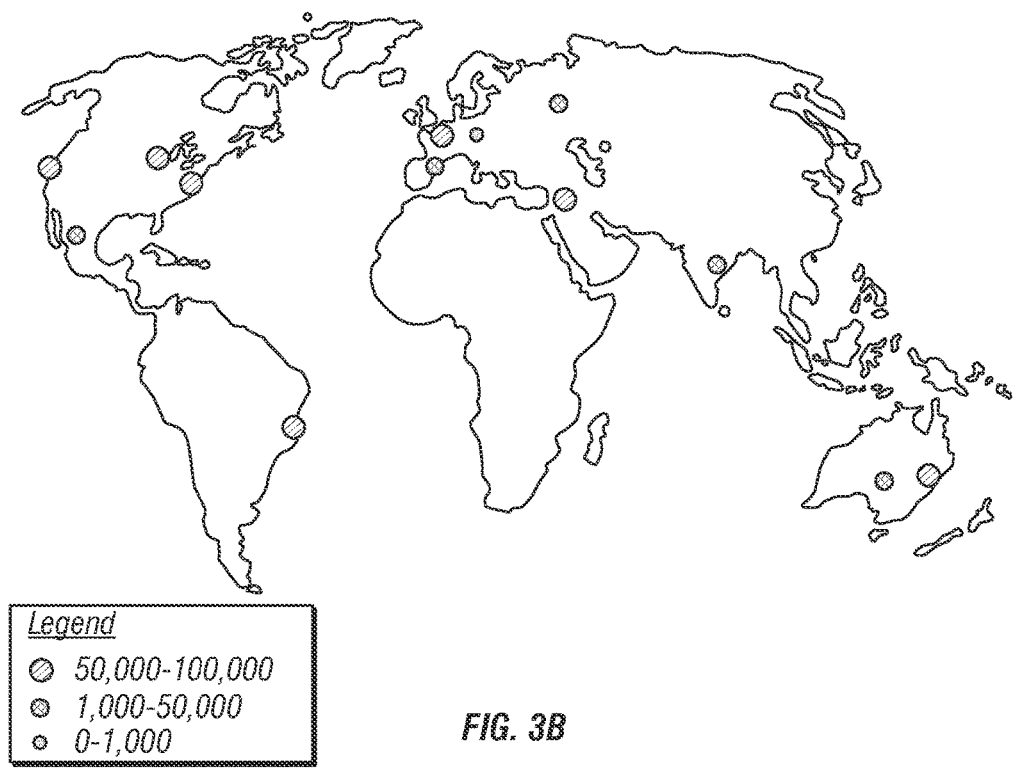
Figure 3C:
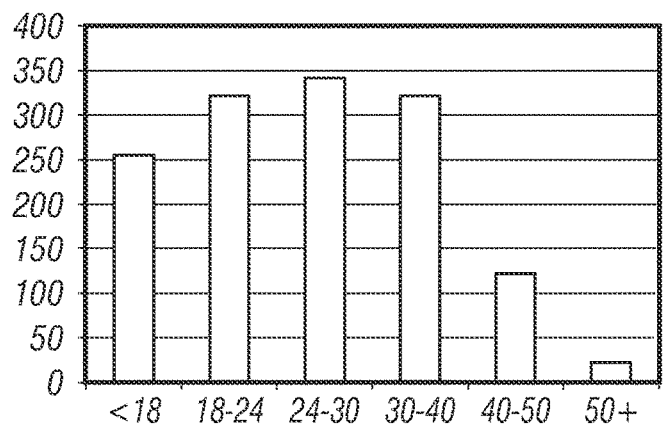
Figure 3C:
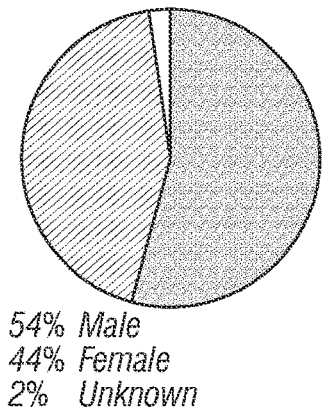

The GUI 230 displays the viewership-related analytics data produced by the analyzer 220 as charts or text-based reports. In one embodiment, the charts are dynamic. That is, the GUI 230 dynamically changes the displayed content of the chart as the user changes the chart's time scale. FIGS. 3A-3C show examples of charts of the various reports as generated by the GUI 230 according to several embodiments of the invention. FIG. 3A is a chart that shows an attention span report. FIG. 3B is a chart representing the viewership by geography. FIG. 3C shows charts of viewership demographics, specifically, the age distribution and gender distribution of viewers.

Figure 4:
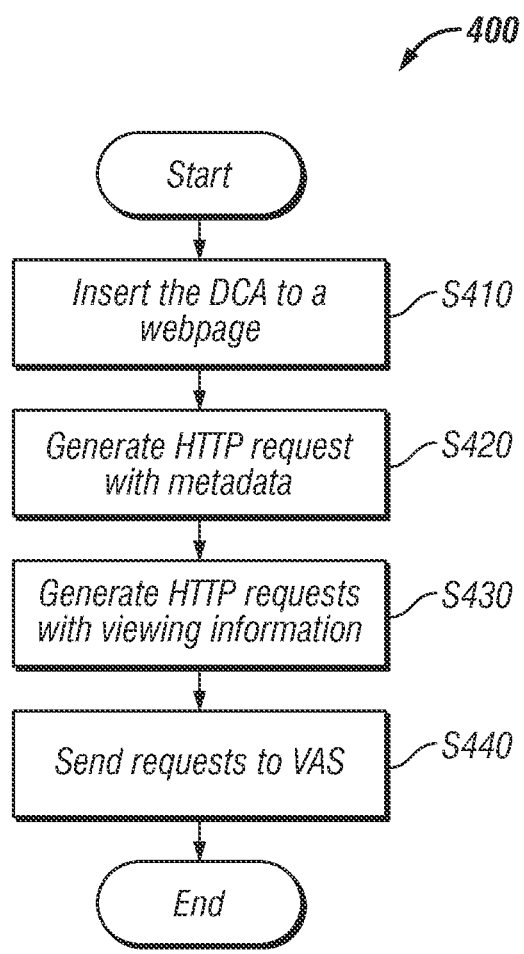
FIG. 4 is a flowchart that illustrates operation of a data collection agent (DCA) according to the invention.

FIG. 4 is a flowchart 400 that shows the steps for operating the DCA in accordance with one embodiment of the invention. When a web page that includes a video clip is loaded, the DCA is inserted S410 on the page and sets a third party cookie in the browser. The third party cookie is used to track the video viewing activity of each unique user across all video providers. The DCA is inserted on the web page using an HTTP response from the server 110 and contains a script code. The DCA generates S420 an HTTP request that includes metadata and sends the request to the VAS 120. This request contains the provider site in the URL path and the ID of the video being viewed, the local client's current time, the client time zone offset, and the non-personally identifiable provider user ID. The VAS 120, upon receiving this request, extracts the metadata and saves it in database 140. Once the video clip is internally loaded in the player, the DCA generates S430 HTTP requests that include the detailed viewing information, for example in the format described above. Thereafter, these HTTP requests are periodically sent S440 to the VAS 120. Once the web page is closed or the browser window location is changed while a video clip is being viewed, the DCA transmits an HTTP request that includes the final data pair that ends at the current viewing time-point.

Figure 5:
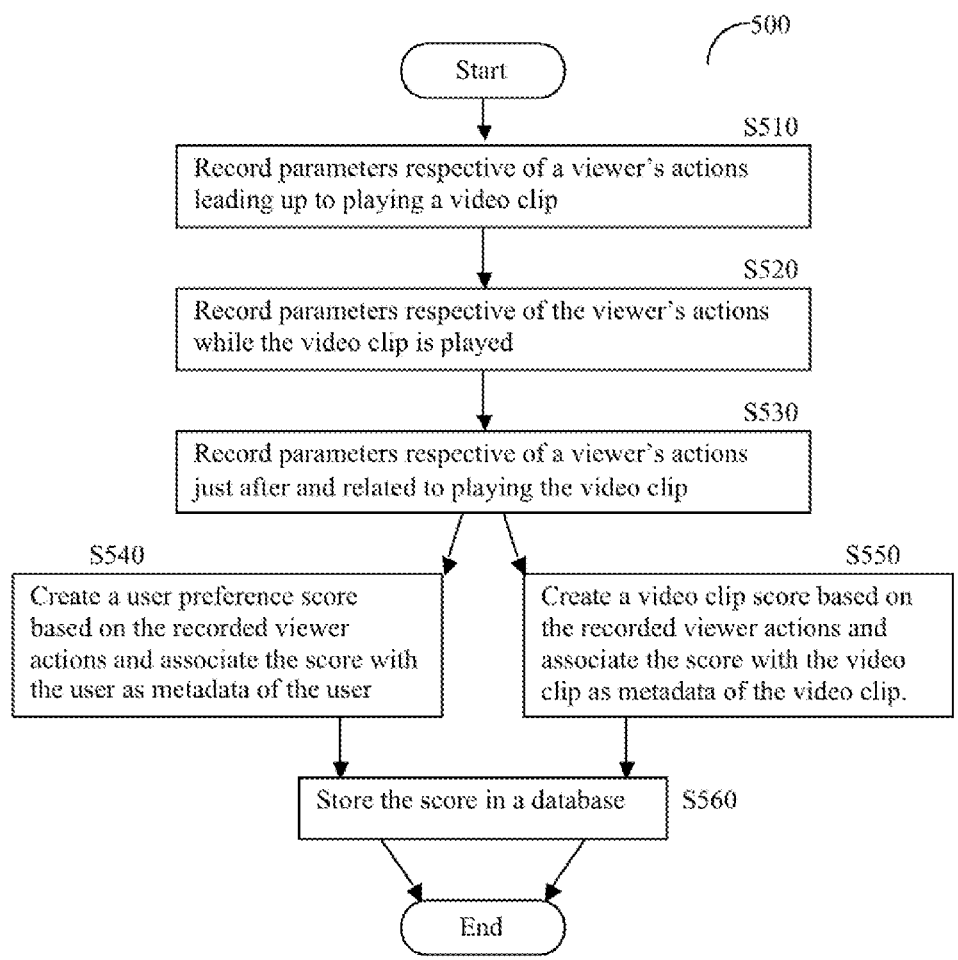
FIG. 5 is a flowchart that illustrates capturing, processing, creating, and recording a preference score for a video clip according to the invention.

The earlier discussion regarding FIG. 1 refers to collecting detailed information about the duration and repetition for viewing a particular video clip. The DCA functionality residing in the viewer's computer 150 or supplying website 110 collects this information passively and may include detailed information to enable further analysis of parameters related, for instance, to viewing duration and repetition. For instance, the DCA may passively record whether a viewer watched a particular video clip at all. It may also record what specific portions of a video clip the viewer watched and the sequence in which they watched those portions. Viewers are known to rewind entire videos, rewind portions of a video, or skip around within a particular video, watching different portions in a regular or irregular sequence. In fact, many other actions of a viewer may be passively observed and used to rate the viewer according to their preferences as well as rate a video clip itself. FIG. 5 is a flowchart 500 that shows the steps for passively collecting and processing behavior or viewership information related to a video clip. Viewer actions that reflect their preferences with respect to a particular video clip may occur before they play the clip, given some foreknowledge of the clip content; while they watch the clip; and after they watch the clip. In step S510, parameters respective of a viewer's behavior and actions leading up to their playing a video clip are recorded. Examples of such actions include but are not limited to:

(i) Enduring a pre-roll advertisement, thus showing an affinity and/or tolerance for ads;

(ii) Accessing the video clip by a particular method:
  (a) Authenticating or logging-in, thus showing higher interest, to view the video clip;
  (b) Being incentivized to see the video, such as obtaining points in an online game; and
(iii) Adjusting the bit rate for streaming or downloading the video prior to playing it, and in which direction they adjusted the bit rate, e.g. faster or slower.

In step S520, parameters respective of a viewer's behavior and actions during their playing of a video clip are recorded. Examples of such actions include but are not limited to:
(i) Adjusting the volume level, muting, and un-muting;
(ii) Pausing and un-pausing;
(iii) Fast-forwarding and rewinding;
(iv) Replaying the video clip, how many times it was replayed, and what portion was replayed;
(v) Viewing duration and % completion;
(vi) Viewing in full-screen mode;
(vii) Adjusting the bit rate for streaming or downloading the video while playing it, and in which direction did they adjust the bit rate, e.g. faster or slower; (viii) Clicking-through on an overlay image or the video itself to be taken to another webpage or website;
(ix) Spending time viewing certain segments of the video clip that are judged to have higher value based on actions of previous viewers; and
(x) Enduring a mid-roll advertisement, thus showing an affinity and/or tolerance for ads.

In step S530, parameters respective of a viewer's behavior and actions after playing of a video clip are recorded. Examples of such actions include but are not limited to:
(i) Sharing the video via an embed code. Generally, with online video a user can copy a small HTML tag out and paste it into their blog to share the video. The system according to the invention tracks the action of copying out that HTML code. Such action may be the operation of a button or simply the act of highlighting the text in a textbox;
(ii) Sharing the video via E-mail; [0055] (iii) Sharing the video via a social network;
(iv) Sharing the video in multiple separate events and how many separate sharing events the viewer initiated to share the video clip;
(v) Waiting for a recorded time duration between viewing the video clip and initiating a sharing event;
(vi) Bookmarking the video clip for later viewing;
(vii) Downloading and saving the video for later viewing; and
(viii) Subscribing to a channel or feed for the video content producer or artist to become better aware of new videos.

In step S540, a viewer preference score is created for the video clip based on the particular viewer's behavior and the score is associated with the user as metadata. In step S550, a video clip score is created for the video clip based on the particular viewer's behavior and the score is associated with the video clip as metadata. When a score is calculated for either the user's preference or the video clip itself, the different factors above that contribute to the score are optionally weighted in the score calculation. For instance, the fact that a video clip is shared may have more value in calculating a preference score than the fact that they paused the video clip. The weighting may also be different for calculating the score for a user's preference relative to a particular clip as opposed to the score for the clip itself. For instance, the fact that the viewer watched the pre-roll advertisement may be more valuable for scoring the user than for scoring the video. Another example of weighting occurs where an un-mute or full-screen action is considered to be a highly-valuable action, whereas simple viewing duration for a video that plays automatically may not be, as it may simply be playing in the user's browser without their attention.

In step S560, the viewer preference score and the video clip score are recorded in a database.

Figure 6:
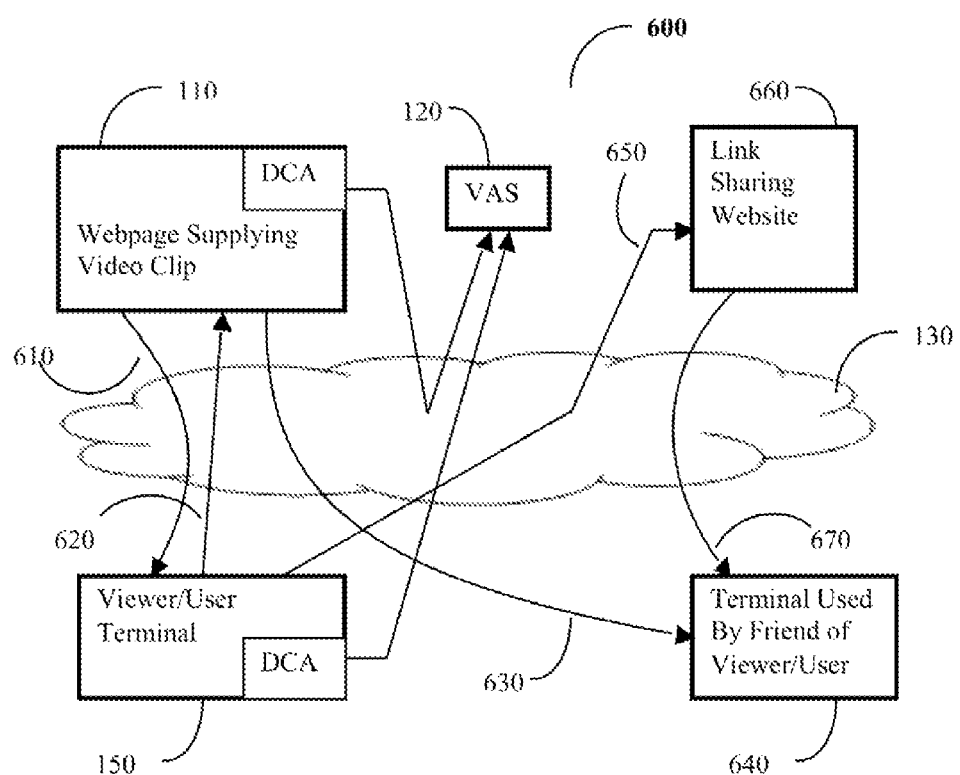
FIG. 6 is a block schematic diagram that shows communication alternatives for sharing a video clip with other persons according to the invention.

Network 600 in FIG. 6 shows a flow of information within an embodiment of the invention with regard to sharing of information related to video clips between users. Sharing typically occurs by way of a wide-area network 130 normally comprising the Internet or a portion thereof. The sharing process is initiated by the terminal belonging to a primary viewer/user 150 who decides that a particular video clip is interesting enough or entertaining enough to share with a friend. A terminal or communication device 640 as shown would typically be used by a friend or a group of friends. Many types of communication devices or terminals are known in the art to be used for communication within social networks and include PCs and smart phones. The process is initiated when the primary viewer at terminal 150 is supplied a video clip 610 from a webpage 110. This video clip may be supplied automatically without any initiation by the user, or it may be supplied to the user upon some action the user takes to view the video clip. When the primary viewer decides they wish to share a video clip they may be offered the ability to share by way of webpage 110, or alternately by providing the link to the particular video clip to a third-party link sharing website 660. When a sharing request 620 is made by viewer 150 to website 110, website 110 can notify a friend at terminal 640 via email or directly if the friend at terminal 640 is logged into website 110.

User 150 may also share the link to a video clip through communication path 650 and a third-party website 660 where link sharing is supported. Examples of link sharing websites include, but are not limited to, digg, del.icio.us, and reddit. Links to video clips can also be shared in a similar manner via social networking sites such as Facebook® and twitter. Sharing behaviors can be monitored by DCA functions located in the viewer's computer 150, located on a server at the supplying website 110, or both. Data gathered by these DCA functions is periodically transferred to VAS 120 for logging, analysis, and reporting. The link sharing website may communicate with a friend using terminal 640 via email or directly if terminal 640 is logged into website 660. In addition to the sharing mechanisms described in FIG. 6, sharing may also be accomplished via an embed code as previously described for step S530 of FIG. 5.

Passively monitored sharing activity may include at least one or more of the following:
i. If a viewer shared a particular video clip;
ii. How many times they shared the video clip;
iii. How many persons they shared the clip with;
iv. Which sharing mechanisms and/or websites they chose to use to share the video clip; and
v. The time duration between when they watched the clip and when they shared it.

While immediately sharing a video clip certainly shows interest, sharing the video clip after a period of time has passed shows that the video clip left a lasting impression on the viewer. Also, should the user initiate a large number of separate sharing events or sharing actions for a particular video clip, this may provide an indication that the video clip deserves a higher score for the sharing-based component of its score.

Thus, passively observed user actions and behaviors are used to rate a particular user's preferences relative to the video clip in question, as well as rate the video clip itself.

It should be appreciated by a person skilled in the art that methods, processes and systems described herein can be implemented in software, hardware, firmware, or any combination thereof. The implementation may include the use of a computer system having a processor and a memory under the control of the processor, the memory storing instructions adapted to enable the processor to carry out operations as described hereinabove. The implementation may be realized, in a concrete manner, as a computer program product that includes a tangible computer readable medium holding instructions adapted to enable a computer system to perform the operations as described above.

Although the invention is described herein with reference to the preferred embodiment, one skilled in the art will readily appreciate that other applications may be substituted for those set forth herein without departing from the spirit and scope of the present invention. Accordingly, the invention should only be limited by the claims included below.

We claim:

1. A computer-implemented method of performing analytics of viewing of video clips comprising:
    monitoring, by a video analytics server, videos viewed by client devices;
    identifying IP addresses of the client devices having viewed the videos;
    maintaining a history file of video identifiers that identify videos that have been viewed during a predefined period of time from each IP address of the IP addresses;
    detecting that a video corresponding to one of the video identifiers has been viewed a number of times from a given IP address that is above a threshold value within the predefined period of time;
    determining that attempts are being performed by browser refreshes or scripting that artificially inflate a view count based on the video having been viewed the number of times from the given IP address that is above the threshold value within the predefined period of time; and
    discarding subsequent views of the video at the given IP address that has been viewed the number of times from the given IP address that is above the threshold value within the predefined period of time.

2. The computer-implemented method of claim 1, wherein monitoring videos viewed by client devices comprises:
    receiving an HTTP requests from client devices having interacted with one or more of the videos; and
    extracting metadata from the HTTP requests indicating user actions relative to the videos.

3. The computer-implemented method of claim 2, wherein identifying IP addresses of the client devices having viewed the videos comprises extracting the IP addresses from the HTTP requests.

4. The computer-implemented method of claim 2, further comprising inserting a data collection script into a player or webpage that displays the videos, wherein the data collection script is programmed to monitor user activity relative to the videos and send activity data to the video analytics server.

5. A computer-implemented method of generating a viewer preference scores for videos comprising:
    inserting a data collection plug-in into a video player that is provided by a webpage which provides a video that is hosted on a web server, wherein the data collection plug-in is programmed to monitor user activity relative to the video;
    receiving one or more requests from the video player, wherein the one or more requests comprise metadata that represents the user activity relative to the video;
    extracting the metadata from the one or more requests to:
        determine actions of a viewer on the webpage which provides the video prior to commencement of the video;
        determine actions of the viewer relative to the video during play of the video;
        determine whether the viewer shared the video after completion of the video; and
        determine a time period between completion of the video and sharing the video;
    generating a score for viewer preference of the video, without explicit user feedback from the viewer, based on the determined actions of the viewer on the webpage prior to commencement of the video, determined actions of the viewer during play of the video, the determination of whether the viewer shared the video after completion of the video, and the determined time period between completion of the video and sharing the video; and
    associating the generated score with the viewer in association with the video.

6. The computer-implemented method of claim 5, wherein determining actions of the viewer relative to the video during play of the video comprises determining whether the viewer:
    adjusts a volume level of the video;
    pauses or un-pauses the video;
    fast-forwards or rewinds the video;
    replays the video or a portion thereof;
    views the video for a recorded duration or a percent completion;
    views the video in full-screen mode;
    adjusts a bit rate for streaming or downloading the video during play of the video;
    clicks-through on an overlay image or on the video itself to be taken to another webpage or another website;
    spends time viewing certain segments of the video; or
    endures a mid-roll advertisement.

7. The computer-implemented method of claim 5, wherein determining whether the viewer shared the video after completion of the video comprises determining whether the viewer:
    shared the video via an embed code;
    shared the video via e-mail; or
    shared the video via social network.

8. The computer-implemented method of claim 5, further comprising extracting the metadata from the one or more requests to determine:
    a number of times the viewer shared the video; and
    a number of people with which the viewer shared the video.

9. The computer-implemented method of claim 5, wherein generating the score for viewer preference of the video comprises differentially weighting the determined actions of the viewer.

10. The computer-implemented method of claim 8, wherein generating the score for viewer preference of the video is further based on the number of times the viewer shared the video and the number of people with which the viewer shared the video.

11. The computer-implemented method of claim 5, further comprising:
  extracting the metadata from the one or more requests to determine which sharing mechanism the viewer utilized to share the video; and
  generating the score for viewer preference of the video further based on the determined sharing mechanism the viewer utilized to share the video.

12. The method of claim 11, wherein the sharing mechanism comprises sharing the video via email or sharing the video via a third party web site.

13. A non-transitory computer-readable medium comprising instructions thereon, that when executed by one or more processors, cause a computing device to:
  insert a data collection plug-in into a video player that is provided by a webpage which provides a video that is hosted on a web server, wherein the data collection plug-in is programmed to monitor user activity relative to the video;
  receive one or more requests from the video player, wherein the one or more requests comprise metadata that represents the user activity relative to the video;
  extract the metadata from the one or more requests to:
    determine actions of a viewer on the webpage which provides the video prior to commencement of the video;
    determine actions of the viewer relative to the video during play of the video;
    determine whether the viewer shared the video after completion of the video; and
    determine a time period between completion of the video and sharing the video;
  generate a score for viewer preference of the video, without explicit user feedback from the viewer, based on the determined actions of the viewer on the webpage prior to commencement of the video, determined actions of the viewer during play of the video, the determination of whether the viewer shared the video after completion of the video, and the determined time period between completion of the video and sharing the video; and
  associating the generated score with the viewer in associated with the video.

14. The non-transitory computer-readable medium of claim 13, wherein the instructions, when executed by the one or more processors, cause the computing device to determine actions of the viewer relative to the video during play of the video by determining whether the viewer:
  adjusts a volume level of the video;
  pauses or un-pauses the video;
  fast-forwards or rewinds the video;
  replays the video or a portion thereof;
  views the video for a recorded duration or a percent completion;
  views the video in full-screen mode;
  adjusts a bit rate for streaming or downloading the video during play of the video;
  clicks-through on an overlay image or on the video itself to be taken to another webpage or another web site;
  spends time viewing certain segments of the video; or
  endures a mid-roll advertisement.

15. The non-transitory computer-readable medium of claim 13, wherein the instructions, when executed by the one or more processors, cause the computing device to determine whether the viewer shared the video after completion of the video by determining whether the viewer:
  shared the video via an embed code;
  shared the video via E-mail; or
  shared the video via social network.

16. The non-transitory computer-readable medium of claim 13, wherein the instructions, when executed by the one or more processors, cause the computing device to extract the metadata from the one or more requests to determine:
  a number of times the viewer shared the video; and
  a number of people with which the viewer shared the video.

17. The non-transitory computer-readable medium of claim 13, wherein the instructions, when executed by the one or more processors, cause the computing device to generate the score for viewer preference of the video by differentially weighting the determined actions of the viewer.

18. The non-transitory computer-readable medium of claim 13, wherein the instructions, when executed by the one or more processors, cause the computing device to identify an IP address of a client device from the one or more requests.

19. The non-transitory computer-readable medium of claim 16, wherein the instructions, when executed by the one or more processors, cause the computing device to generate the score for viewer preference of the video is further based on the number of times the viewer shared the video and the number of people with which the viewer shared the video.

20. The non-transitory computer-readable medium of claim 13, wherein the instructions, when executed by the one or more processors, cause the computing device to:
  detect that the video has been viewed a number of times from a given IP address that is above a threshold value within a predefined period of time;
  determine that attempts are being performed by browser refreshes or scripting that artificially inflate a view count based on the video having been viewed the number of times from the given IP address that is above the threshold value within the predefined period of time; and
  discard subsequent views of the video at the given IP address that has been viewed the number of times from the given IP address that is above the threshold value within the predefined period of time.

* * * * *